(12) United States Patent
Salvador Lara et al.

(10) Patent No.: US 7,900,688 B2
(45) Date of Patent: Mar. 8, 2011

(54) INSTANTANEOUS AIR-HEATING UNIT

(75) Inventors: Aniceto Salvador Lara, Sant Quirze De Safaja (ES); Juan Lloveras Calvo, Barcelona (ES)

(73) Assignee: Juan Lloveras Calvo, Barcelona (ES)

( * ) Notice: Subject to any disclaimer, the term of this patent is extended or adjusted under 35 U.S.C. 154(b) by 1061 days.

(21) Appl. No.: 10/579,730

(22) PCT Filed: Mar. 10, 2004

(86) PCT No.: PCT/ES2004/000108
§ 371 (c)(1),
(2), (4) Date: May 17, 2006

(87) PCT Pub. No.: WO2005/090105
PCT Pub. Date: Sep. 29, 2005

(65) Prior Publication Data
US 2007/0095502 A1 May 3, 2007

(51) Int. Cl.
*B60H 1/00* (2006.01)
(52) U.S. Cl. ...................... 165/41; 236/49.3; 237/12.3 R
(58) Field of Classification Search .................... 165/41; 236/49.3; 237/12.3 A, 12.3 B, 12.3 R
See application file for complete search history.

(56) References Cited

U.S. PATENT DOCUMENTS

| | | | | |
|---|---|---|---|---|
| 4,386,733 A * | 6/1983 | Bradshaw | ................... | 236/49.3 |
| 4,920,033 A * | 4/1990 | Cress | ........................... | 434/198 |
| 5,915,619 A | 6/1999 | Etheve | | |

FOREIGN PATENT DOCUMENTS

| | | |
|---|---|---|
| DE | 101 00 134 A | 9/2002 |
| FR | 2 416 128 A1 | 8/1979 |
| GB | 1 120 118 A | 7/1968 |

* cited by examiner

*Primary Examiner* — Ljiljana (Lil) V Ciric
(74) *Attorney, Agent, or Firm* — Birch, Stewart, Kolasch & Birch, LLP

(57) ABSTRACT

An air heater includes a bell housing semi-attached to an exhaust fume output manifold of an engine of a vehicle for collecting hot air, preferably during starting, linked by an air hose to a small turbine or an extractor which forces air into vehicle's compartment, to front and rear screens or to exterior rear view mirrors by way of a suitable pipe or several of these; a thermostat for shutting off the air heater and opening up or turning on the vehicle's conventional heater by means of a manual or electrically-operated butterfly valve, shutting off the turbine. It includes a bell housing semi-attached to the exhaust fume output manifold of an engine of a vehicle for collecting hot air, preferably during starting, linked by an air hose to a small turbine or an extractor which forces air into the vehicle's compartment.

1 Claim, 2 Drawing Sheets

INSTANTANEOUS AIR-HEATING UNIT

OBJECT OF THE INVENTION

The present invention refers to an instant air heater from amongst those means for heating small areas, particularly passenger compartments of motor vehicles, and for defrosting their screens.

This invention is characterised by a bell-housing semi-attached to the exhaust fume manifold during vehicle starting, a unit that forces the air into the compartment, with disconnection means for switching off this instant heating and switching over to conventional heating, plus a $CO_2$ detector which stops the turbine or acts as a butterfly valve for cutting off the air flow and activates a warning light and/or buzzer.

BACKGROUND OF THE INVENTION

The problems arising from cold, which may actually reach the inside of motor vehicles in extreme circumstances, even force these vehicles to be provided with double glazing and, in general, make driving disagreeable or uncomfortable and are not remedied in the course of short trips merely by driving.

The applicant is unaware of the existence of other means that will remedy the afore-mentioned problems with the simplicity and efficiency of the invention, which is now going to be described.

DESCRIPTION OF THE INVENTION

The present invention refers to an instant air heater from amongst those heating means, preferably of motor vehicle passenger compartments and, on a supplementary basis, for defrosting their screens.

This invention is characterised by a special construction of a bell housing for collecting hot air in an arrangement semi-attached to the vehicle exhaust fume manifold, set up to operate during the vehicle start-up time.

An air hose links it to a small turbine or an extractor fan which, by way of a suitable pipe or pipes, forces the air into the area to be heated and/or to the element that requires a higher temperature, such as for instance the front and rear screens, as well as the exterior rear view mirrors.

The assembly also has disconnection means for switching off this instant heating and switching over to conventional heating, consisting for example of a butterfly valve operated conventionally by manual, electrical or other means.

Lastly, it is provided with a $CO_2$ detector that shuts off the turbine or extractor which operates the air flow shut-off valve and which activates a warning light and/or buzzer on a redundant basis.

DESCRIPTION OF THE DRAWINGS

The present descriptive report is supplemented with a set of drawings illustrating the preferred embodiment and never limiting the scope of the invention.

PREFERRED EMBODIMENT OF THE INVENTION

Figure 1:
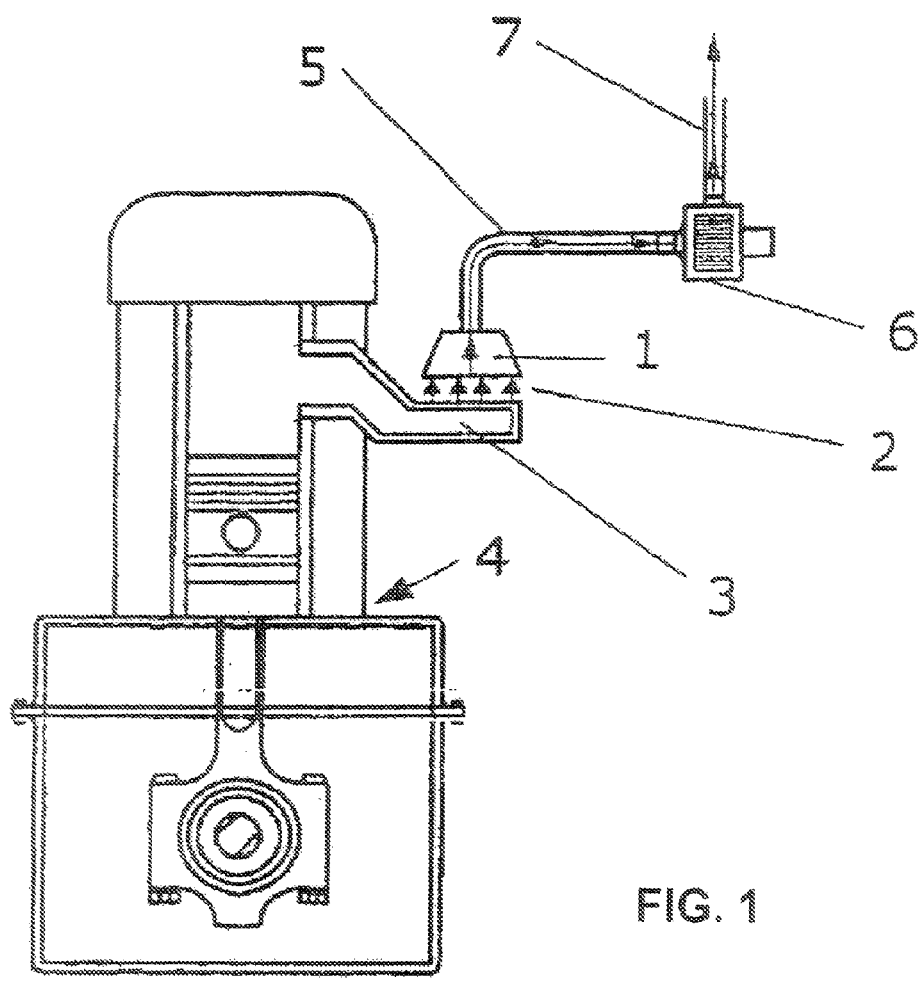
FIG. 1 is a diagrammatic representation of the main installation that is the object of the present invention, showing the bell-housing and the means of extracting and forcing the air heated by the exhaust output manifolds.
Figure 2:
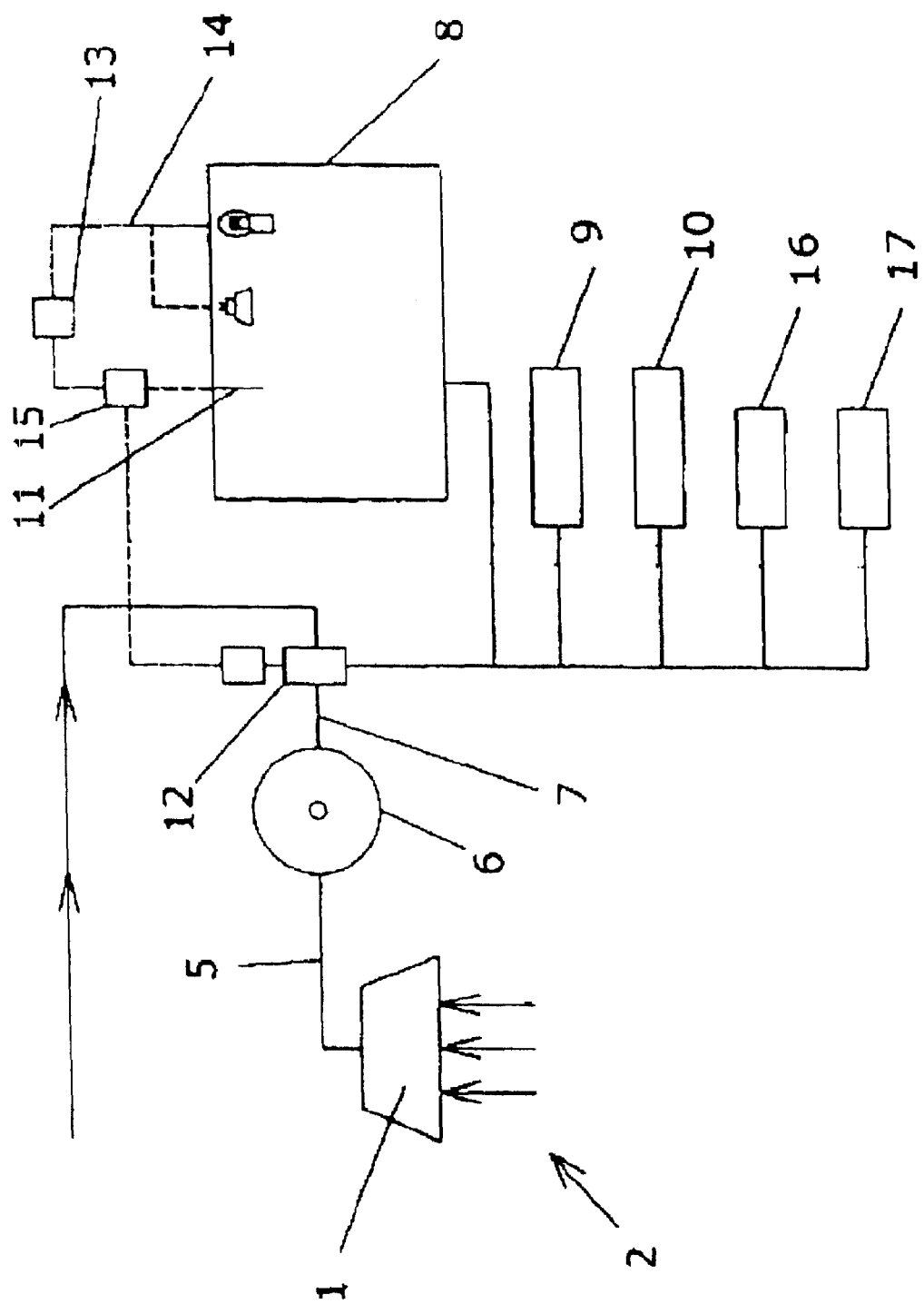
FIG. 2 is a block diagram which shows the assemblage of the items making up this invention.

In view of what is stated above, the present invention refers to an air heater which produces an instant heating, from amongst the means for the heating of motor vehicle passenger compartments and for defrosting their screens, characterised in that they are made up of a bell-housing (1) semi-attached to an exhaust gas outlet manifold (3) of an engine (4) of a vehicle for collecting the hot air (2), preferably while it is being started, linked by an air hose (5) to a small turbine (6) or an extractor which forces the air into a vehicle's compartment (8), to front and rear screens (9) or exterior rear view mirrors (10) by way of a pipe (7) or several of these.

The assembly uses a thermostat (11) to shut off the air heater and opens up or turns on the conventional heater of the vehicle by means of a manual or electrically-operated butterfly valve (12), stopping the turbine (6) and, alternatively a $CO_2$ detector (13) which, besides shutting off the latter when pre-set temperatures are reached, activates a warning light and/or buzzer (14), which may or may not be controlled by a central electronic unit (15).

The essential nature of this invention is not altered by variations in materials, shape, size and arrangement of the component parts, described on a non-restrictive basis, in such a way that this explanation may suffice for the invention to be reproduced by an expert.

The invention claimed is:

1. An air heater for heating passenger compartments of motor vehicles heated by a conventional heater and for defrosting windscreens of vehicles, comprising
    a bell housing attached to an exhaust fume output manifold of vehicle engine for collecting hot air, linked by
    an air hose to
    a turbine or an extractor which, by way of
    at least one pipe, forces hot air into the vehicle's compartment, to front and rear screens or exterior rear view mirrors
    a thermostat for shutting off the vehicle's air heater and switching over to the vehicle's conventional heater by means of
    a manual or electrically-operated butterfly valve, and stopping the turbine
    a $CO_2$ detector that shuts off the turbine or extractor which operates an air flow shut-off valve and activates a warning light and/or buzzer in the compartment, and
    includes a central electronic unit for controlling operation.

* * * * *